United States Patent [19]

Frey

[11] 3,806,195

[45] Apr. 23, 1974

[54] SEAT BELT SYSTEM
[75] Inventor: Stuart M. Frey, Birmingham, Mich.
[73] Assignee: Ford Motor Company, Dearborn, Mich.
[22] Filed: Mar. 26, 1973
[21] Appl. No.: 345,027

[52] U.S. Cl. ............................................... 297/385
[51] Int. Cl. ............................................ A62b 35/00
[58] Field of Search .......... 297/385, 384, 386, 387, 297/388, 389, 390; 248/393, 394, 395, 396, 397, 398, 429; 280/150 SB

[56] References Cited
UNITED STATES PATENTS

| | | | |
|---|---|---|---|
| 2,990,009 | 6/1961 | Moeller | 297/385 |
| 3,147,995 | 9/1964 | Bohlin | 297/385 |
| 3,204,916 | 9/1965 | Pickles | 248/429 |
| 3,288,422 | 11/1966 | Krause | 297/385 X |
| 3,207,554 | 9/1965 | Dall | 297/385 |
| 3,315,935 | 4/1967 | Clevett, Jr. et al. | 297/385 X |
| 3,384,415 | 5/1968 | Monroe | 297/388 |
| 3,451,719 | 6/1969 | De Lorean | 297/385 |
| 3,727,977 | 4/1973 | Gmeiner | 297/385 X |
| 3,737,197 | 6/1973 | Hall | 297/385 |
| 3,758,158 | 9/1973 | Raoke et al. | 297/385 |

Primary Examiner—James T. McCall
Attorney, Agent, or Firm—John J. Roethel; Keith L. Zerschling

[57] ABSTRACT

A seat belt system for restraining an occupant in a vehicle seat structure, the latter being mounted on a vehicle floor for fore and aft position adjustments. The seat belt system includes a fixed length belt segment coupled to a cam means carried on a bracket means attached to the seat structure, whereby the belt segment is attached to and movable with the seat to any adjusted position of the latter. Passenger restraint loads, to the extent imposed on the fixed length belt segment, are transferred to the vehicle floor structure through clamping engagement of the cam means with a loop of belt anchored at each of its ends to the vehicle floor structure.

5 Claims, 2 Drawing Figures

PATENTED APR 23 1974        3,806,195

SEAT BELT SYSTEM

BACKGROUND OF THE INVENTION

Conventional seat belt systems associated with the front seats of vehicles utilize three attachment points for the passenger restraint belts to the vehicle body structure. Two of the attachment points are located on the vehicle floor structure, one at each side of the seat occupant position. The third is located on the outboard side of the seating position at the roof rail. This third anchor is usually eliminated for a center seating position on a bench type seat adapted to seat the vehicle operator and two passengers.

The seat belt connected to the anchor points or attachment points usually comprises a two segment lap belt and an elongated segment shoulder harness (except for the center seating position) which is attachable to the buckle on one of the lap belt segments. The buckle carrying segment of the lap belt is usually relatively short and of fixed length. The other lap belt segment and the shoulder harness segment are of adjustable length either by virtue of having an adjustment means on the belt segment or by virtue of being attached to a spring loaded reel of a retractor device.

Most seats are mounted on the vehicle floor structure on a seat adjuster mechanism which permits for or aft adjustment of the seat relative to the operating pedals and steering wheel. Since the buckle carrying segment of the seat belt is short and of fixed length, the position of the buckle relative to the center of the seat occupant becomes a variable depending on the fore or aft position of the seat. To eliminate this variable, it is desirable that the belt segment be anchored to the seat structure so that the belt segment will be carried with the seat to any fore or aft position of adjustment of the latter.

The anchoring of the seat belt segment to the seat belt has the disadvantage, however, that any passenger restraint loads imposed on the belt segment are transferred to the vehicle floor through the seat adjuster mechanism. Since such mechanisms have a certain inherent degree of looseness or play in the parts, the mechanism is less able to sustain as heavy a loading as an anchor directly connected to the vehicle floor.

The desirability of having the buckle carrying segment of the seat belt system attached to the adjustable seat structure without losing the effectiveness of being anchored directly to the floor structure was recognized in U.S. Pat. No. 3,147,995 issued Sept. 8, 1964 to N. I. Bohlin for "Safety Belt Device for Vehicles." The structure disclosed in the Bohlin patent, however, comprises a number of parts having metal to metal contact and therefore subject to rattling noises and requiring lubrication to avoid movement squeaks. The rigidity of the parts also indicates difficulties might arise from a tendency of the parts to jam during attempted adjustment movements of the seat structure in a fore and aft direction.

It is an object of the present invention to provide a construction and arrangement in which the metal to metal contact is minimized and in which the inherent flexibility of the system also minimizes resistance to movements of the seat relative to the vehicle floor during fore and aft adjustment.

SUMMARY OF THE INVENTION

The present invention relates to an improvement in a seat belt system for restraining an occupant in a vehicle seat, the vehicle seat being mounted on a vehicle floor structure for fore and aft position adjustment movements. The seat belt of the system has a short segment of fixed length to which elongated adjustable occupant restraint segments may be buckled. The improvement in the system comprises a loop of belt fastened at each of its ends to the vehicle floor structure beneath the movable seat. A bracket means depends from the seat toward the floor structure and a guide means over which the loop of belt passes is mounted in the bracket means. A cam means is pivoted in the bracket means and has a cam portion contiguous to the loop of belt where the latter passes over the guide means. One end of the short segment of the seat belt is attached to the cam means whereby the short segment is movable with the seat upon adjustment of the position of the latter relative to the floor structure. The cam means is normally freely movable over the loop of belt as the seat is moved fore or aft to a selected position of adjustment. Upon a passenger restraint load being placed on the seat belt system, the short belt segment causes the cam means to swing into a position in which the cam portion clamps against the loop of belt and the guiding means there-beneath to transfer the seat belt load to the vehicle floor structure.

BRIEF DESCRIPTION OF THE DRAWING

Further features and advantages of the present invention will be made more apparent as this description proceeds, reference being had to the accompanying drawings, wherein.

DESCRIPTION OF THE PREFERRED EMBODIMENT

Figures 1, 2:
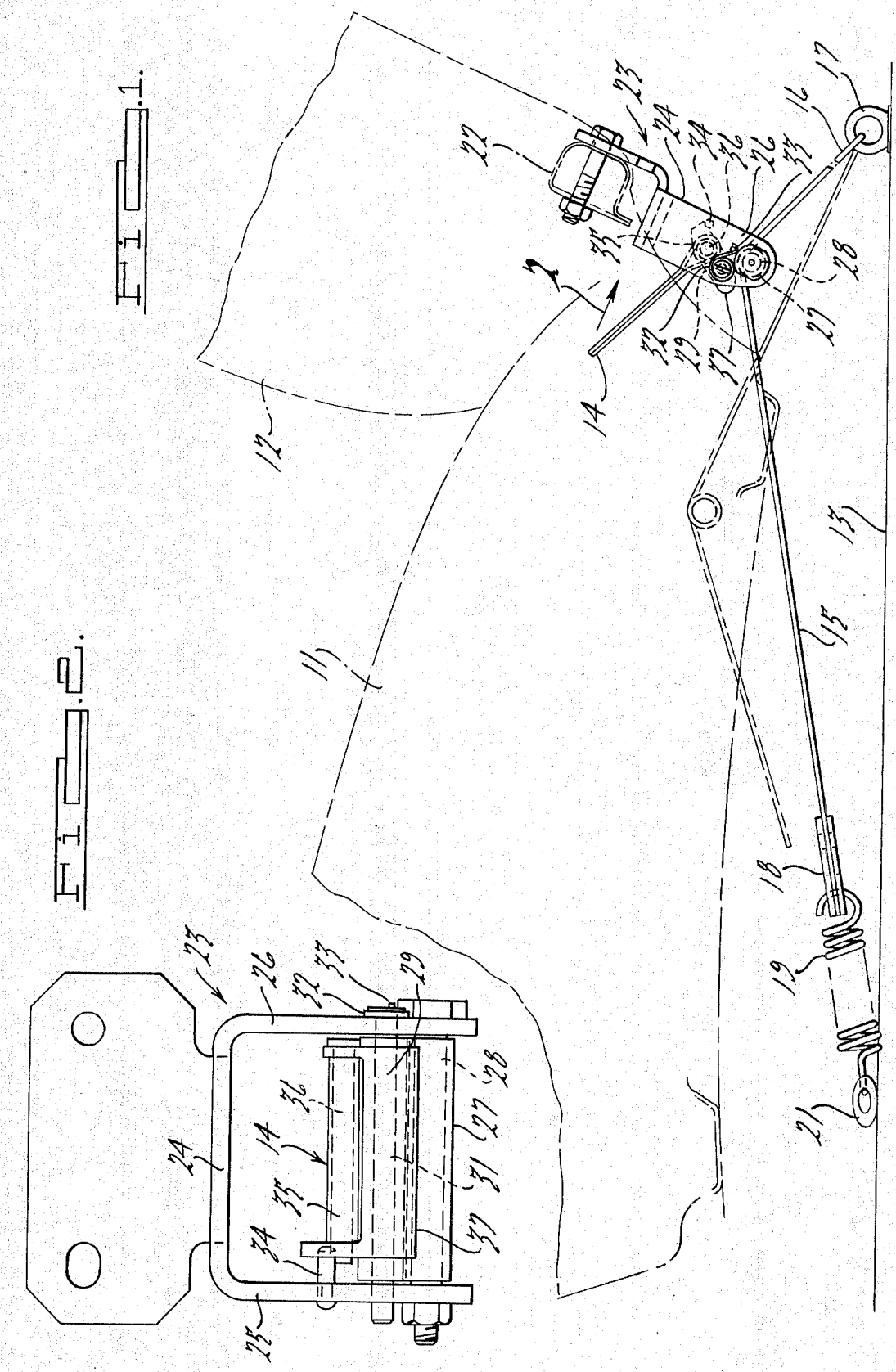
FIG. 1 is a side view of the seat belt system embodying the present invention.
FIG. 2 is a view in the direction of the arrow 2 in FIG. 1.

Referring to the drawing, FIG. 1 schematically represents a vehicle seat 11 having a backrest 12, the seat being mounted by any conventional seat adjuster mechanism (not shown) on a vehicle floor structure 13. The seat structure may be a bench type seat or a bucket seat. Regardless of the type of seat, it is mounted for fore and aft position adjustment movement on the seat adjuster mechanism so that the vehicle operator may properly and comfortably position himself relative to the vehicle control pedals and steering wheel.

Most current models of vehicles are equipped with passenger restraint systems utilizing a three-point belt arrangement. In this arrangement two of the belt anchor points are located on the floor structure, one at each side of the occupant's seating position. The third anchor point is located at one side slightly to the rear and above the seating position. The two floor anchors receive each end of the two-piece lap belt, one segment of the lap belt carrying a buckle device and the other carrying a tongue element latchable in the buckle device. The third anchor device receives one end of an elongated shoulder harness segment. The other end of the shoulder harness is engageable with a retention device on the buckle device. In some installations, one lap belt segment and the shoulder harness segment are formed as a continuous loop. The anchored end of the tongue carrying segment of the lap belt and the anchored end of the shoulder harness segment may each be coupled to retractor devices which automatically adjust the length of the belt to the girth of the seat occupant or the belt segments may have length adjustment features as an integral part of the belts.

The present invention is directly concerned with the buckle device carrying belt segment indicated at 14 in FIG. 1. This segment 14 is relatively short and of fixed or non-adjustable length. In an optimum position of the vehicle seat, the buckle device (not shown) is located in a predetermined off center position on the hip line of the seat occupant. Preferably, as a seat is repositioned in a fore or aft direction to accommodate the vehicle operator to the pedals and steering wheel, the belt segment 14 should move with the seat. If the belt segment 14 is directly anchored to the floor structure 13, the buckle end of the belt segment 14 moves relatively rearwardly as the seat is moved forwardly causing difficulty in connecting the tongue device and throwing the restraint belt segments too far around the seat occupant.

To avoid this problem, an auxiliary loop of belt 15 is fastened at its end 16 to an anchor 17 secured to the floor structure 13. The end 18 of the loop of belt 15 is coupled to a tension spring 19 coupled to an anchor 21 secured to the floor structure 13.

Fastened to the frame member 22 of the seat backrest 12 is a depending bracket 23 having a downwardly opening U-shaped portion 24. Extending between the legs 25–26 of the U-shaped portion is a guiding means in the form of a roller 27 journalled on a shaft 28. The loop of belt 15 passes over this roller.

A cam member 29 is pivotally mounted within the bracket portion legs 25–26 on a shaft 31 which carries at one end a spring, shown as a clock spring 32, the free end of which engages a pin 33 in the bracket leg 26. The spring 32 tends to rotate the cam member 29 in a clockwise direction as viewed in FIG. 1, against a stop 34.

The end of the short belt segment 14 has a loop 35 through which a pin 36 passes, the pin 36 thus coupling the belt segment to the cam member 29 above the pivot axis of the latter. The cam member 29 has a cam or nose portion 37 adapted to engage the surface of the loop of belt 15 at the roller or guiding means 27.

OPERATION

Usually, when a vehicle operator gets into the vehicle and occupies a seat 11, the first thing he does is to move the seat in a fore or aft direction so that his position is adjusted relative to the pedals and steering column.

The loop of belt 15 fastened over the roller 27 offers very little resistance to such fore and aft adjustment movements. The cam or nose portion 37 of the cam member 29 is either in a disengaged or only a lightly engaged frictional relationship to the surface of the loop of belt 15, the cam member being held against the stop 34 by the spring 32. Since the seat belt segment 14 carrying the buckle device is anchored to the cam member 29 which is carried on the bracket 23, the seat belt segment 14 moves with the seat as the latter is adjusted in a fore or aft direction. Thus, the buckle device on the end of the seat belt segment 14 always remains in the optimum designed position relative to the seat.

Upon the passenger restraint system being placed about the vehicle seat occupant, there may be slgiht displacement of the cam member 29 from its at rest position shown in FIG. 1 so that the nose portion will ride on the loop member 15 and slightly clamp the latter against the roller 27. The frictional engagement, however, will not be so great as to prevent the vehicle seat occupant from adjusting the seat in a fore and aft direction even after he as placed the belt system around himself.

In the event of a sudden passenger restraint load being placed on the seat belt system, such as may occur if the vehicle brakes are suddenly applied or if the vehicle actually impacts an object or another vehicle, the short belt segment 14 will rotate the cam member 29 in a counterclockwise direction, as viewed in FIG. 1 so that the nose portion 37 will foreceably clamp the loop of belt 15 against the roller 27 and transfer the seat belt load through the anchor 17 to the floor structure 13, just as though the seat belt segment 14 had been directly anchored to the floor structure 13 as in a conventional installation in which the seat belt segment 14 is not movable with the seat 11.

It is to be understood that the invention is not limited to the exact construction illustrated and described above, but that various changes and modifications may be made without departing from the spirit and scope of the invention defined by the following claims.

I claim:

1. In a seat belt system for restraining an occupant in a vehicle seat,
   the vehicle seat being mounted on a vehicle floor structure for fore and aft position adjustment movement,
   and the seat belt having a short segment of fixed length to which elongated adjustable occupant restraint segments are buckled,
   the improvement comprising:
   a loop of belt fastened at each of its ends to the vehicle floor structure beneath the movable seat,
   bracket means depending from the seat toward the floor structure,
   guide means over which the loop of belt passes mounted in the bracket means
   cam means pivoted in the bracket means and having a cam portion contiguous to the loop of belt where the latter passes over the guide means,
   one end of the short segment of the seat belt being attached to the cam means whereby the short segment is movable with the seat upon adjustment of the position of the latter relative to the floor structure,
   the cam means normally being freely movable over the loop of belt as the seat is moved fore or aft to a selected position of adjustment,
   and upon a passenger restraint load being placed on the seat belt system, the short belt segment causing the cam means to swing into a position in which the cam portion clamps against the loop of belt and the guiding means therebeneath to transfer the seat belt load to the vehicle floor structure.

2. In a seat belt system according to claim 1, in which:
   the loop of belt is attached at one end to the floor structure by a tension spring to maintain the loop taut over the guide means.

3. In a seat belt system according to claim 2, in which:
   the cam means is coupled to a spring means anchored to the bracket means to maintain the cam means in its normally inactive position in which its cam portion is relatively freely movable over the loop of belt.

4. In a seat belt system according to claim 3, in which:
the guide means comprises a roller journalled on the bracket means.

5. In a seat belt according to claim 1, in which:
the cam means is coupled to a spring means anchored to the bracket means to maintain the cam means in its normally inactive position in which its cam portion is substantially freely movable over the loop of belt.

* * * * *